US012707480B2

(12) United States Patent
Xue et al.

(10) Patent No.: US 12,707,480 B2
(45) Date of Patent: Aug. 11, 2026

(54) METHOD AND APPARATUS FOR SPECTRUM SHARING OPERATION IN MULTIPLE WIRELESS COMMUNICATION SYSTEMS

(71) Applicant: SAMSUNG ELECTRONICS CO., LTD., Suwon-si (KR)

(72) Inventors: Peng Xue, Suwon-si (KR); Wontae Yu, Suwon-si (KR); Jeewoong Kang, Suwon-si (KR); Changkee Min, Suwon-si (KR); Hyunkyu Yu, Suwon-si (KR); Youngbin Chang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 604 days.

(21) Appl. No.: 18/100,211

(22) Filed: Jan. 23, 2023

(65) Prior Publication Data

US 2023/0164804 A1 May 25, 2023

Related U.S. Application Data

(63) Continuation of application No. PCT/KR2021/006194, filed on May 18, 2021.

(30) Foreign Application Priority Data

Jul. 24, 2020 (KR) ........................ 10-2020-0092586

(51) Int. Cl.
*H04W 72/27* (2023.01)
*H04W 72/0453* (2023.01)

(52) U.S. Cl.
CPC ....... *H04W 72/27* (2023.01); *H04W 72/0453* (2013.01)

(58) Field of Classification Search
CPC ..... H04W 16/14; H04W 24/10; H04W 72/12; H04W 16/10; H04W 28/0278;
(Continued)

(56) References Cited

U.S. PATENT DOCUMENTS 8,140,018 B2 * 3/2012 Abedi .................. H04W 16/14 455/63.2
10,142,944 B2 * 11/2018 Lopes ................ H04W 72/541
(Continued)

FOREIGN PATENT DOCUMENTS

JP 2007074718 A 3/2007
KR 1020120081819 A 7/2012
(Continued)

OTHER PUBLICATIONS

International Search Report (ISA/210) issued Aug. 20, 2021 by the International Searching Authority in International Application No. PCT/KR2021/006194.

(Continued)

*Primary Examiner* — Brian T O Connor
(74) *Attorney, Agent, or Firm* — Sughrue Mion, PLLC

(57) ABSTRACT

A method is performed by a first Base Station (BS) in a wireless communication system. The method includes receiving second network information of a second BS from the second BS of the wireless communication system. The first BS supports a wireless access scheme that is different from a wireless access scheme of the second BS and shares a same frequency band with the second BS. The method further includes determining a resource allocation ratio between the first BS and the second BS according to a predefined resource allocation scheme based on first network information of the first BS and the second network information of the second BS; and transmitting information on the resource allocation ratio to the second BS.

20 Claims, 11 Drawing Sheets

(58) Field of Classification Search

CPC ... H04W 28/082; H04W 4/06; H04W 72/044; H04W 72/0446; H04W 72/0453; H04W 72/21; H04W 72/27; H04W 72/30; H04W 72/56; H04W 88/08; H04W 92/20; H04W 12/08; H04W 16/04; H04W 16/06; H04W 28/02; H04W 28/0284; H04W 28/12; H04W 28/20; H04W 48/16; H04W 52/242; H04W 72/00; H04W 72/046; H04W 72/1215; H04W 72/20; H04W 72/23; H04W 72/29; H04W 72/51; H04W 72/541; H04W 74/002; H04W 74/0833; H04W 76/15; H04W 76/27; H04W 76/40; H04W 84/045; H04W 84/047; H04W 84/20; H04W 88/06; H04W 88/10; H04W 92/12; H04L 5/001; H04L 5/0048; H04L 1/1819; H04L 12/189; H04L 27/2602; H04L 27/26025; H04L 5/0023; H04L 5/0035; H04L 5/0053; H04L 5/0062; H04L 5/0091; H04L 5/0098; H04L 5/14

See application file for complete search history.

(56) References Cited

U.S. PATENT DOCUMENTS

| | | | | |
|---|---|---|---|---|
| 10,595,330 | B2 * | 3/2020 | Jeon | H04W 16/04 |
| 11,265,902 | B2 * | 3/2022 | Jeon | H04W 72/12 |
| 11,382,052 | B2 * | 7/2022 | Yang | H04W 76/22 |
| 11,418,967 | B2 * | 8/2022 | Centonza | H04W 16/14 |
| 11,496,257 | B2 * | 11/2022 | Khirallah | H04L 5/001 |
| 11,503,606 | B2 * | 11/2022 | Toeda | H04W 72/54 |
| 12,021,609 | B2 * | 6/2024 | Parkvall | H04J 11/0079 |
| 12,075,458 | B2 * | 8/2024 | Zhao | H04W 72/56 |
| 2012/0178462 | A1 | 7/2012 | Kim | |
| 2014/0206377 | A1 | 7/2014 | Priotti | |
| 2015/0237645 | A1 | 8/2015 | Andrianov et al. | |
| 2016/0057504 | A1 | 2/2016 | Shelby et al. | |
| 2016/0295429 | A1 | 10/2016 | Enqvist | |
| 2017/0257774 | A1 | 9/2017 | Ghosh et al. | |
| 2018/0020469 | A1 * | 1/2018 | Jeon | H04W 16/04 |
| 2018/0098225 | A1 * | 4/2018 | Damnjanovic | H04W 74/08 |
| 2019/0141538 | A1 | 5/2019 | Jones | |
| 2019/0239199 | A1 | 8/2019 | Yi et al. | |
| 2019/0357264 | A1 | 11/2019 | Yi et al. | |
| 2020/0137630 | A1 | 4/2020 | Choi et al. | |
| 2020/0145967 | A1 | 5/2020 | Park et al. | |
| 2020/0221484 | A1 * | 7/2020 | Jeon | H04W 16/04 |
| 2020/0280937 | A1 * | 9/2020 | Yang | H04W 76/27 |
| 2020/0396740 | A1 * | 12/2020 | Toeda | H04W 72/541 |
| 2021/0105107 | A1 * | 4/2021 | Khirallah | H04W 72/27 |
| 2021/0385661 | A1 * | 12/2021 | Centonza | H04W 16/14 |
| 2023/0022964 | A1 * | 1/2023 | Lins De Medeiros | H04W 28/16 |
| 2023/0171745 | A1 * | 6/2023 | Ghanbarinejad | H04W 76/19 370/329 |
| 2024/0421931 | A1 * | 12/2024 | Parkvall | H04J 11/0079 |

FOREIGN PATENT DOCUMENTS

| | | | |
|---|---|---|---|
| KR | 10-2016-0089239 | A | 7/2016 |
| KR | 1020190092619 | A | 8/2019 |
| WO | 2019097476 | A1 | 5/2019 |
| WO | 2019145878 | A1 | 8/2019 |

OTHER PUBLICATIONS

Written Opinion (ISA/237) issued Aug. 20, 2021 by the International Searching Authority in International Application No. PCT/KR2021/006194.

Communication dated Aug. 1, 2025, issued by Korean Intellectual Property Office in Korean Patent Application No. 10-2020-0092586.

* cited by examiner

METHOD AND APPARATUS FOR SPECTRUM SHARING OPERATION IN MULTIPLE WIRELESS COMMUNICATION SYSTEMS

CROSS-REFERENCE TO RELATED APPLICATIONS

This application is a by-pass continuation application of International Application No. PCT/KR2021/006194, filed on May 18, 2021, which based on and claims priority to Korean Patent Application No. 10-2020-0092586, filed on Jul. 24, 2020, in the Korean Intellectual Property Office, the disclosures of which are incorporated by reference herein in their entireties.

BACKGROUND

1. Field

The disclosure relates to a spectrum sharing method and apparatus, and more specifically, to a method and apparatus for sharing a spectrum between multiple wireless communication systems.

2. Description of Related Art

To meet increased demand for wireless data traffic since deployment of 4G communication systems, efforts have been made to develop an improved 5G or pre-5G communication system. The 5G or pre-5G communication system is also called a "beyond 4G network" communication system or a "post LTE" system. The 5G communication system is considered to be implemented in ultrahigh frequency (mmWave) bands (e.g., 60 GHz bands) so as to accomplish higher data rates. To decrease propagation loss of the radio waves and increase the transmission distance in the ultrahigh frequency bands, beamforming, massive Multiple-Input Multiple-Output (massive MIMO), Full Dimensional MIMO (FD-MIMO), array antenna, analog beam forming, large scale antenna techniques are discussed in 5G communication systems.

In 5G communication systems, development for system network improvement is under way based on advanced small cells, cloud Radio Access Networks (cloud RANs), ultra-dense networks, Device-To-Device (D2D) communication, wireless backhaul, moving network, cooperative communication, Coordinated Multi-Points (CoMP), reception-end interference cancellation, and the like. In the 5G system, hybrid FSK and Quadrature Amplitude Modulation (QAM) modulation (FQAM) and Sliding Window Superposition Coding (SWSC) as an Advanced Coding Modulation (ACM), and Filter Bank Multi Carrier (FBMC), Non-Orthogonal Multiple Access (NOMA), and Sparse Code Multiple Access (SCMA) as an advanced access technology have also been developed.

The Internet has evolved to the Internet of things (IoT) where distributed entities, such as things, exchange and process information without human intervention. The Internet of Everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a Machine-To-Machine (M2M) communication, Machine Type Communication (MTC), and so forth have been recently researched. Such an IoT environment may provide intelligent Internet Technology (IT) services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

Various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered an example of convergence of the 5G technology with the IoT technology.

To meet the increased demand for wireless data traffic, 5G communication systems are under development, and for efficient system replacements, the coexistence of 5G with 4G LTE is simultaneously under discussion. When multiple wireless communication systems coexist in the same frequency band, it is necessary to efficiently share the spectrum according to the situations of the systems.

SUMMARY

Provided is a method of dynamically sharing a spectrum and frame operation according to the method.

According to an aspect of the disclosure, a method performed by a first base station (BS) in a wireless communication system, includes: receiving second network information of a second BS from the second BS in the wireless communication system, wherein the first BS supports a wireless access scheme that is different from a wireless access scheme of the second BS and shares a same frequency band with the second BS; determining a resource allocation ratio between the first BS and the second BS according to a predefined resource allocation scheme based on first network information of the first BS and the second network information of the second BS; and transmitting information on the resource allocation ratio to the second BS.

The first network information may include at least one of information on a number of terminals connected to the first BS, information on an amount of data accumulated in a buffer of at least one terminal of the terminals connected to the first BS, or information on an amount of resources used for data transmission of the first BS, and the second network information may include at least one of information on a number of terminals connected to the second BS, information on an amount of data accumulated in a buffer of at least one terminal of the terminals connected to the second BS, or information on an amount of resources used for data transmission of the second BS.

The determining the resource allocation ratio may include determining a state for the wireless communication system based on the information on the amount of data accumulated in the buffer of the at least one terminal of the terminals connected to the first BS and the information on the amount of data accumulated in the buffer of the at least one terminal of the terminals connected to the second BS.

The state may be one of: a first state in which a number of heavy Buffer Occupancy (BO) terminals connected to the first BS and a number of heavy BO terminals connected to the second BS are equal to or less than a first value; a second state in which the number of heavy BO terminals connected to the first BS exceeds the first value and the number of heavy BO terminals connected to the second BS is less than or equal to the first value; a third state in which the number of heavy BO terminals connected to the first BS is less than or equal to the first value and the number of heavy BO terminals connected to the second BS exceeds the first value; and a fourth state in which the number of heavy BO terminals connected to the first BS and the number of heavy BO terminals connected to the second BS exceed the first value, and a heavy BO terminal is determined based on whether the amount of data accumulated in a buffer of a corresponding terminal exceeds a specific threshold.

The determining the resource allocation ratio may include, in case that the state is changed, the first state is maintained, or the fourth state is maintained: determining a ratio of terminals between the first BS and the second BS based on the information on the number of terminals connected to the first BS and the information on the number of terminals connected to the second BS; and determining the resource allocation ratio between the first BS and the second BS based on the ratio of terminals.

The determining the resource allocation ratio may include, in case that the second state is maintained: determining an amount of remaining resources for the second BS based on the information on the amount of resources used for data transmission of the second BS; and tuning the resource allocation ratio between the first BS and the second BS based on the amount of remaining resources.

The determining the resource allocation ratio may include, in case that the third state is maintained: determining an amount of remaining resources for the first BS based on the information on the amount of resources used for data transmission of the first BS; and tuning the resource allocation ratio between the first BS and the second BS based on the amount of remaining resources.

The first BS corresponds to a Long Term Evolution (LTE) BS supporting an LTE wireless access scheme, and the second BS corresponds to a New Radio (NR) BS supporting an NR wireless access scheme.

According to an aspect of the disclosure, a first base station (BS) in a wireless communication system, includes: a transceiver; and a processor coupled to the transceiver and configured to: receive second network information of a second BS from the second BS in the wireless communication system, wherein the first BS supports a wireless access scheme that is different from a wireless access scheme of the second BS and shares a same frequency band with the second BS; determine a resource allocation ratio between the first BS and the second BS according to a predefined resource allocation scheme based on first network information of the first BS and the second network information of the second BS; and transmit information on the resource allocation ratio to the second BS.

The first network information may include at least one of information on a number of terminals connected to the first BS, information on an amount of data accumulated in a buffer of at least one terminal of the terminals connected to the first BS, or information on an amount of resources used for data transmission of the first BS, and the second network information may include at least one of information on a number of terminals connected to the second BS, information on an amount of data accumulated in a buffer of at least one terminal of the terminals connected to the second BS, or information on an amount of resources used for data transmission of the second BS.

The processor may be further configured to determine a state for the wireless communication system based on the information on the amount of data accumulated in the buffer of the at least one terminal of the terminals connected to the first BS and the information on the amount of data accumulated in the buffer of the at least one terminal of the terminals connected to the second BS.

The state may be one of: a first state in which a number of heavy Buffer Occupancy (BO) terminals connected to the first BS and a number of heavy BO terminals connected to the second BS are equal to or less than a first value; a second state in which the number of heavy BO terminals connected to the first BS exceeds the first value and the number of heavy BO terminals connected to the second BS is less than or equal to the first value; a third state in which the number of heavy BO terminals connected to the first BS is less than or equal to the first value and the number of heavy BO terminals connected to the second BS exceeds the first value; and a fourth state in which the number of heavy BO terminals connected to the first BS and the number of heavy BO terminals connected to the second BS exceed the first value, and a heavy BO terminal is determined based on whether the amount of data accumulated in a buffer of a corresponding terminal exceeds a specific threshold.

The processor may be further configured to, in case that the state is changed, the first state is maintained, or the fourth state is maintained: determine a ratio of terminals between the first BS and the second BS based on the information on the number of terminals connected to the first BS and the information on the number of terminals connected to the second BS; and determine the resource allocation ratio between the first BS and the second BS based on the ratio of terminals.

The processor may be further configured to, in case that the second state is maintained: determine an amount of remaining resources for the second BS based on the information on the amount of resources used for data transmission of the second BS; and tune the resource allocation ratio between the first BS and the second BS based on the amount of remaining resources.

The processor may be further configured to, in case that the third state is maintained: determine an amount of remaining resources for the first BS based on the information on the amount of resources used for data transmission of the first BS; and tune the resource allocation ratio between the first BS and the second BS based on the amount of remaining resources.

The first BS corresponds to an LTE BS supporting an LTE wireless access scheme, and the second BS corresponds to an NR BS supporting an NR wireless access scheme.

According to an aspect of the disclosure, a non-transitory computer-readable storage medium storing instructions which, when executed by a processor of a first base station in a wireless communication system, cause the first base station to perform operations is provided. The operations includes receiving second network information of a second BS from the second BS in the wireless communication system, wherein the first BS supports a wireless access scheme that is different from a wireless access scheme of the second BS and shares a same frequency band with the second BS; determining a resource allocation ratio between the first BS and the second BS according to a predefined resource allocation scheme based on first network information of the first BS and the second network information of the second BS; and transmitting information on the resource allocation ratio to the second BS.

According to the disclosure, resources can be efficiently used by dynamically allocating resources in a time/frequency domain between 4G LTE and 5G NR. By classifying the state according to the traffic situation of each system, it is possible to apply an appropriate resource distribution operation suitable for each state, and increase the efficiency of resource use by adjusting resources between 4G LTE and 5G NR according to a Buffer Occupancy (BO) situation of each system.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
FIG. 1 illustrates multiple wireless communication systems.
Figure 1:
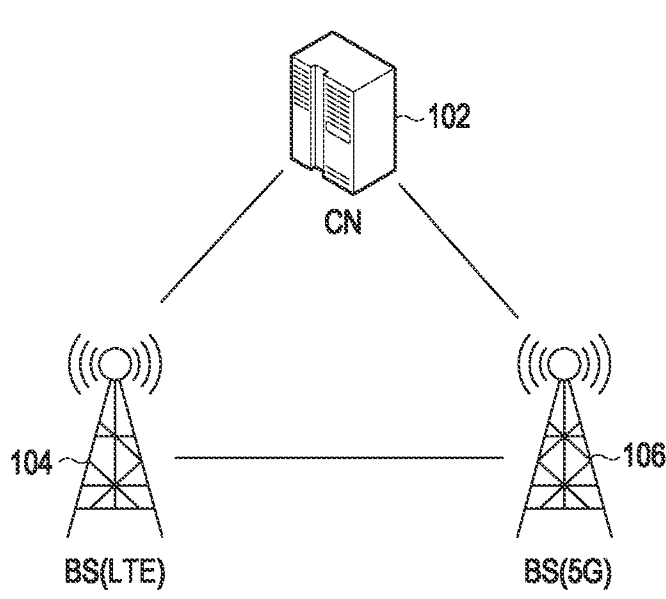
Figure 1:
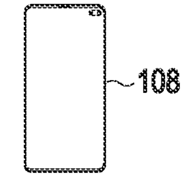

The following description with reference to the accompanying drawings is provided to assist in comprehensive understanding of various embodiments of the disclosure as defined by the claims and equivalents thereof. The description includes various specific details to assist in the understanding, but the details are to be regarded merely as examples. Accordingly, those skilled in the art will recognize that various changes and modifications may be made to the various embodiments set forth herein without departing from the scope and spirit of the disclosure. In addition, descriptions of well-known functions and configurations may be omitted for the sake of clarity and conciseness.

It will be understood that like reference numbers may refer to like parts, components, and structures throughout the drawings.

The terms and words used in the following description and the claims are not limited to the bibliographical meanings thereof, but are merely used to enable clear and consistent understanding of the disclosure. Accordingly, it will be apparent to those skilled in the art that the following description of various embodiments of the disclosure is provided merely for the purpose of illustration and is not intended to limit the disclosure as defined by the appended claims and equivalents thereof.

It is to be understood that the singular forms "a," "an," and "the" include plural referents unless the context clearly dictates otherwise. Therefore, for example, reference to "a component surface" includes reference to one or more such surfaces.

By the term "substantially" it is meant that the recited characteristic, parameter, or value does not need to be achieved exactly, but deviations or variations (e.g., tolerances, measurement error, measurement accuracy limitations, and other factors known to those of skill in the art) may occur in amounts that do not preclude the effect intended by the characteristic or like to provide.

It is known to those skilled in the art that blocks of flow charts (or sequence diagrams) and combinations of the flow charts may be represented and performed by computer program instructions. These computer program instructions may be loaded into processors for a general computer, a special computer, or other programmable data processing devices. The loaded program instructions, when executed by the processors, create means for performing the functions specified in the flow charts. The computer program instructions may also be stored in a computer readable memory usable in a special computer or programmable data processing device, and thus it is also possible to produce an article of manufacture performing the functions specified in the flow charts. The computer program instructions may also be loaded onto a computer or programmable data processing device, they may, when executed as processes, perform the functions specified in the flow charts.

Each block of the flowcharts may correspond to a module, segment, or code which includes at least one executable instruction for implementing at least one logical function or correspond to a portion thereof. In some cases, the functions noted in the blocks may occur out of the order of the enumerated blocks. For example, two blocks shown in succession may be executed concurrently or in the reverse order.

As used herein, the term "unit or module" may refer to a software element or a hardware element, such as a Field Programmable Gate Array (FPGA) or an Application Specific Integrated Circuit (ASIC), which may perform a specific function or operation. However, the meaning of the "unit or module" is not limited to software or hardware. The "unit or module" may be configured to reside in an addressable storage medium or operate one or more processors. The "unit" may refer to software elements, object-oriented software elements, class elements, task elements, processes, functions, properties, procedures, sub-routines, program code segments, drivers, firmware, micro-codes, circuits, data, databases, data structures, tables, arrays, and parameters. The functions provided by the element and the "unit or module" may be implemented by combinations of smaller elements or "units or modules" or may be combined with other elements or "units or modules" to form a larger element or "unit or module". The elements and "units or modules" may be configured to operate one or more processors in a device or a security multimedia card.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description of the disclosure, terms and names defined in the Long Term Evolution (LTE) and 5G communication system standards are used. However, the disclosure is not limited by these terms and names, and may be applied in the same way to systems that conform other standards.

Hereinafter, embodiments of the disclosure will be described in detail with reference to the accompanying drawings. A detailed description of known functions or configurations that may make the subject matter of the disclosure unnecessarily unclear will be omitted.

FIG. 1 illustrates a multi-wireless communication system. A multi-wireless communication system of the disclosure refers to a system supporting multi-radio connectivity. For example, the multi-radio communication system may be a communication system supporting 4G LTE-based wireless access (connection) and 5G New Radio (NR)-based wireless access (connection). That is, the multi-wireless communication system may be a system in which an LTE communication system and an NR communication system coexist. In this disclosure, the multi-wireless communication system may be abbreviated as a wireless communication system.

In FIG. 1, a multi-wireless communication system 100 may include one or more Core Networks (CNs) 102, one or more first Base Stations (BSs) 104, and one or more second BSs 106.

In the embodiment of FIG. 1, the first BS 104 may be a base station providing LTE wireless access (e.g., Evolved Universal Terrestrial Radio Access (E-UTRA)). The first BS 104 may provide a control plane and a user plane based on LTE wireless access technology to a terminal. In this disclosure, the first BS 104 may be referred to as a first node, an LTE base station, a 4G base station, an eNB, an eNodeB, or the like. In the disclosure, a communication system (sub-communication system) including one or more first BSs included in the multi-wireless communication system 100 may be referred to as an LTE system.

In the embodiment of FIG. 1, the second BS 106 may be a base station providing 5G wireless access (e.g., NR wireless access). The second BS 106 may provide a control plane and a user plane based on 5G wireless access technology to a terminal. In this disclosure, the second BS 106 may be referred to as a second node, a 5G base station, a NR base station, an eNB, an eNodeB, or the like. In the disclosure, a communication system (sub-communication system) including one or more second BSs included in the multi-wireless communication system 100 may be referred to as an NR system.

In the embodiment of FIG. 1, the CN 102 may be, for example, an LTE-based Evolved Packet Core (EPC) and a 5G-based 5th Generation Core (5GC). In this case, the EPC may include Mobility Management Entity (MME), Serving Gateway (S-GW), etc., and the 5GC may include access and Mobility Management Function (AMF), Session Management Function (SMF), User Plane Function (UPF), etc.

In the embodiment of FIG. 1, a terminal 108 is a device used by a user and may provide a multi-wireless access function (e.g., LTE access and NR access functions). In the disclosure, a terminal may be referred to as User Equipment (UE), a mobile station, a subscriber station, a remote terminal, a wireless terminal, and the like.

Base stations may be connected to each other through a first predefined interface. For example, the first BSs may be connected to each other through a predefined interface 1-1, the second BSs may be connected to each other through a predefined interface 1-2, and the first BS and the second BS may be connected to each other through a predefined interface 1-3.

Each BS may be connected to one or more CNs through a predefined second interface. For example, the first BS and the second BS may be connected to the EPC and 5GC through the predefined second interface.

In the disclosure, one or more embodiments of the disclosure will be described based on a multi-wireless communication system providing LTE and 5G wireless access, such as the embodiment of FIG. 1. However, the main gist of the disclosure can be applied to other multi-wireless communication systems having a similar technical background with modifications within a range that does not greatly depart from the scope of the disclosure, which requires ordinary technical knowledge in the technical field of the disclosure. For example, one or more embodiments of the disclosure may also be applied to a multi-wireless communication system providing 5G and 6G wireless access.

Figure 2:
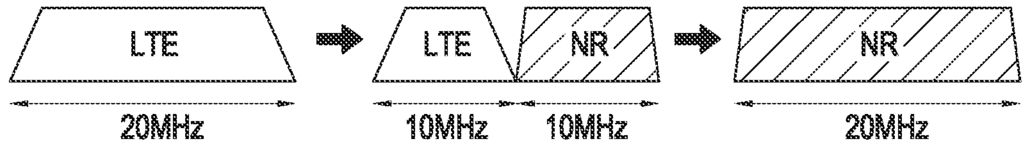
FIG. 2 illustrates a scheme of providing a multi-wireless access function by dividing a frequency band in which a multi-wireless communication system is supported.
Figure 3:
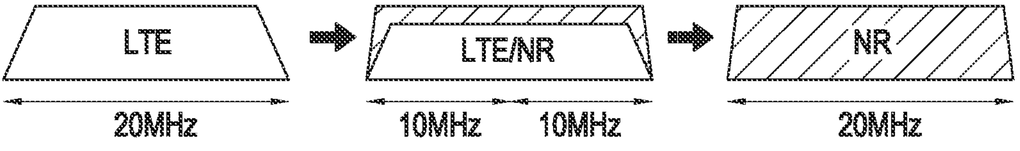
FIG. 3 illustrates a scheme of providing a multi-wireless access function by sharing a frequency band in which multiple wireless communication systems are supported.

Hereinafter, with reference to FIGS. 2 and 3, a scheme of providing a multi-wireless access function (e.g., LTE wireless access and NR wireless access functions) using one frequency band supported by a multi-wireless communication system, which is currently under discussion, will be described. In the embodiments of FIGS. 2 and 3, a frequency band having a frequency bandwidth of, for example, 20 MHz is supported.

FIG. 2 illustrates a scheme of providing a multi-wireless access function by dividing a frequency band in which a multi-wireless communication system is supported. In other words, the embodiment of FIG. 2 illustrates a scheme in which a multi-wireless communication system provides a multi-wireless access function using a frequency/spectrum re-farming scheme. The multi-wireless communication system of FIG. 2 may be referred to as a spectrum re-farming system.

The multi-wireless communication system may appropriately divide frequency bands by monitoring real-time network traffic. For example, as shown in FIG. 2, the multi-wireless communication system may monitor real-time network traffic, divide a 20 MHz frequency band according to network conditions, allocate a lower 10 MHz frequency band for LTE wireless access, and allocate an upper 10 MHz frequency band for NR wireless access.

To this end, the multi-wireless communication system may determine whether the bandwidth requirement for real-time network traffic of a first spectrum satisfies the bandwidth capacity of a first cell of the BS. When the bandwidth capacity is satisfied, the multi-wireless communication system may identify the number of selected subframes of a cell supporting the first spectrum, and reconstruct the number of selected subframes into a Multicast Broadcast Single Frequency Network (MBSFN) frame to support a second spectrum.

The scheme of the embodiment of FIG. 2 simply allows two systems (e.g., LTE and 5G systems) to coexist in the same frequency band without special technology.

FIG. 3 illustrates a scheme of providing a multi-wireless access function by sharing a frequency band supported by a multi-wireless communication system. In order to provide the scheme of the embodiment of FIG. 3, a standardized coexistence mechanism for both systems (LTE and NR systems) is required, and scheduling coordination and restrictions between LTE and NR systems are essential to avoid interference between the respective systems. In this case, the performance of the system depends on how often scheduling coordination is taken into account. In the embodiment of FIG. 3, multiple wireless communication systems may share the entire frequency band of 20 MHz for LTE wireless access and NR wireless access, for example, as illustrated in FIG. 3.

Such frequency sharing may be divided into Static Spectrum Sharing (SSS) and Dynamic Spectrum Sharing (DSS). The SSS is to use a predetermined resource sharing pattern when LTE and NR systems use the same frequency carrier. LTE operation is limited only to allocated LTE resources, and similarly, NR operation is limited only to allocated NR resources. For example, since there will be very few users using NR services in the initial commercialization stage of NR, only minimal resources may be allocated to NR (e.g., LTE:NR=7:3). The DSS is to allocate resources for LTE and NR systems by applying a pattern appropriate to the situation through several predetermined patterns.

In the schemes (currently under discussion described above) with reference to FIGS. 2 and 3, when LTE and NR systems (subsystems) coexist in one multi-wireless communication system, only the concept of dividing and using one frequency supported to both the two systems or sharing and using the same is disclosed. However, those schemes do not suggest a clear operation for how two coexisting systems will share and use resources.

Various services such as smart home, connected car, smart grid, health care, smart home appliance, and advanced medical service, as well as existing Information Technology (IT) services, have begun to be provided, resulting in a significant increase in traffic. Therefore, sharing resources without considering the network conditions of the two systems, as in the schemes of FIGS. 2 and 3, is not only very inefficient, but also does not satisfy the performance required by each service.

Accordingly, the disclosure proposes an efficient resource sharing scheme in the multi-wireless communication system in which LTE and NR systems coexist and frame operation according to the efficient resource sharing scheme. Hereinafter, a configuration and an operation for resource sharing between an LTE base station (eNB) and a NR base station (gNB) will be described.

For example, hereinafter, a frame configuration of LTE and NR, a data sharing process for resource allocation between an LTE BS and a NR BS, a state classification scheme for distinguishing various network situations before determining a resource allocation ratio, and a resource allocation ratio determination operation according to the state will be described.

FIG. 4 illustrates a scheme of dynamically sharing a spectrum in a downlink (DL) of a multi-wireless communication system according to an embodiment of the disclosure. In the embodiment of FIG. 4, the multi-wireless communication system may be, for example, the multi-wireless system of FIG. 1.

In the embodiment of FIG. 4, the multi-wireless communication system may dynamically share a spectrum using one of three schemes. For example, two BSs (e.g., a first BS and a second BS) in the multi-wireless system may dynamically share the spectrum using Time Division Multiplexing (TDM), Frequency Division Multiplexing (FDM), or time/frequency division multiplexing schemes.

In the embodiment of FIG. 4, a frame composed of 10 subframes is a resource sharing unit, such as an LTE frame structure. That is, a resource sharing pattern may be changed in units of LTE frames. In other words, although the resource sharing pattern of one frame and the resource sharing pattern of the next frame may be different, the same resource sharing pattern is used within one frame. However, the disclosure is not limited thereto. For example, a frame such as a 5G frame structure may be used as a resource sharing unit. Furthermore, according to embodiments, not only the frame, but also a slot, a subframe, and a super frame composed of a plurality of frames may be used as a resource sharing unit.

In the embodiment of FIG. 4, subframe #6 of each frame is fixedly configured as an MBSFN frame (subframe) for an NR BS. However, the disclosure is not limited thereto. For example, one or more subframes having different numerical values other than subframe #6 may be configured as an MBSFN frame (subframe) for the NR BS, depending on the implementation scheme. Alternatively, subframe #6 and the one or more subframes having the different numerical values may be configured as MBSFN frames (subframes) for the NR BS.

In an embodiment, the MBSFN frame may include information necessary for the terminal to perform initial access for NR wireless connection, for example, a Physical Broadcast Channel (PBCH) including a Master Information Block (MIB), and a Synchronization Signal Block (SSB) composed of a synchronization signal (including primary synchronization signal and secondary synchronization signal).

Figure 4A:
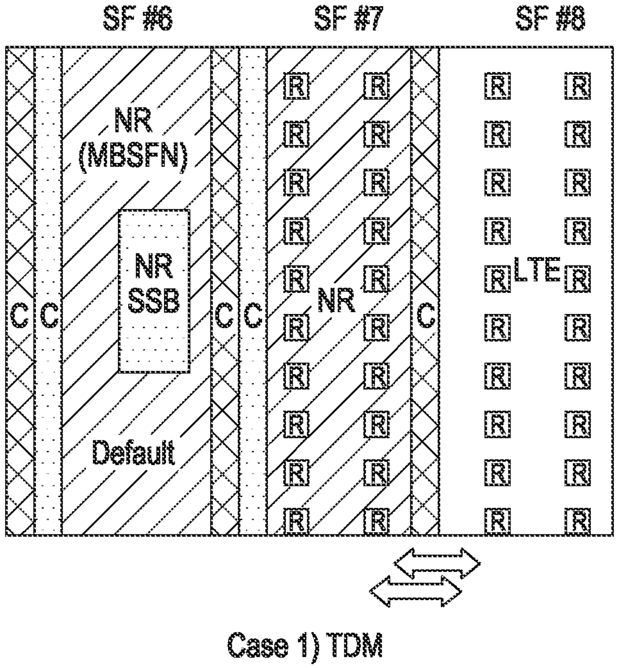
FIG. 4A illustrates a scheme of dynamically sharing a spectrum in a downlink (DL) by a multi-wireless communication system according to an embodiment of the disclosure using a Time Division Multiplexing (TDM) scheme.

FIG. 4A illustrates a scheme of dynamically sharing a spectrum by a multi-wireless communication system in a TDM scheme. In the embodiment of FIG. 4A, an LTE BS and an NR BS in a multi-wireless communication system may allocate each subframe to the LTE BS or the NR BS through a predetermined value of a predefined LTE/NR resource time division pattern as shown in Table 1 or through real-time scheduling. For example, as illustrated in FIG. 4A, subframes #6 and #7 may be allocated for an NR BS, and subframe #8 may be allocated for an LTE BS.

Table 1 shows an example of an LTE/NR resource time division pattern.

TABLE 1

| LTE:NR | SF#0 | SF#1 | SF#2 | SF#3 | SF#4 | SF#5 | SF#6 | SF#7 | SF#8 | SF#9 |
|---|---|---|---|---|---|---|---|---|---|---|
| 9:1 | LTE | LTE | LTE | LTE | LTE | LTE | NR (M) | LTE | LTE | LTE |
| 8:2 | LTE | NR | LTE | LTE | LTE | LTE | NR (M) | LTE | LTE | LTE |

TABLE 1-continued

| LTE:NR | SF#0 | SF#1 | SF#2 | SF#3 | SF#4 | SF#5 | SF#6 | SF#7 | SF#8 | SF#9 |
|---|---|---|---|---|---|---|---|---|---|---|
| 7:3 | LTE | NR | LTE | NR | LTE | LTE | NR (M) | LTE | LTE | LTE |
| 6:4 | LTE | NR | LTE | NR | LTE | LTE | NR (M) | LTE | NR | LTE |
| 5:5 | LTE | NR | LTE | NR | NR | LTE | NR (M) | LTE | NR | LTE |
| 4:6 | LTE | NR | LTE | NR | NR | LTE | NR (M) | NR | NR | LTE |
| 3:7 | LTE | NR | NR | NR | NR | LTE | NR (M) | NR | NR | LTE |
| 2:8 | LTE | NR | NR | NR | NR | LTE | NR (M) | NR | NR | NR |
| 1:9 | LTE | NR | NR | NR | NR | NR | NR (M) | NR | NR | NR |

In Table 1, for example, when a configuration value of the LTE/NR resource time division pattern is a first value (e.g., a value indicating LTE:NR=9:1), subframe #6 may be allocated for the NR BS, and the remaining subframes may be allocated for the LTE BS. Through this, subframe #6 may be used for NR wireless access (or NR service), and the remaining subframes can be used for LTE radio access (or LTE service).

Figure 4B:
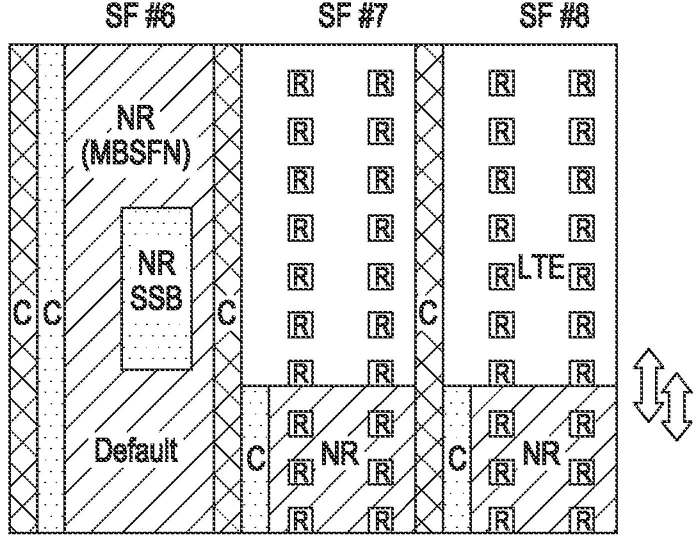
FIG. 4B illustrates a scheme of dynamically sharing a spectrum in a DL by a multi-wireless communication system according to an embodiment of the disclosure using a Frequency Division Multiplexing (FDM) scheme.

FIG. 4B illustrates a scheme of dynamically sharing a spectrum by a multi-wireless communication system in an FDM scheme. In the embodiment of FIG. 4B, the LTE BS and NR BS of the multi-wireless communication system may allocate resources for the LTE BS or NR BS in a Resource Block (RB) unit within a frame through a predetermined configuration value of a predefined LTE/NR resource frequency division pattern or real-time scheduling.

For example, as illustrated in FIG. 4B, since subframe #6 in one frame is fixedly configured as an MBSFN frame (subframe) for the NR BS, corresponding resources may be allocated for the NR BS in subframe #6, and resources may be frequency-divided and allocated, respectively, at a determined resource allocation ratio (e.g., at a ratio of 7:3 to LTE BS and NR BS) in units of resource blocks in the remaining subframes. As an example, the resource allocation ratio may be dynamically determined in consideration of network traffic.

In the NR system, Control Resource Set (CORESET) corresponding to some wireless resources may be allocated to the terminal without the need to receive wireless signals of the entire system band of the BS, so that the terminal may receive control information. Accordingly, the multi-wireless communication system needs to determine the number of RBs for the NR BS in consideration of such a CORESET, and may determine a resource allocation ratio based on the determined number of RBs. When the resource allocation ratio is changed, a Radio Resource Control (RRC) reconfiguration process may be performed to inform the terminal of the changed resource allocation ratio.

Figure 4C:
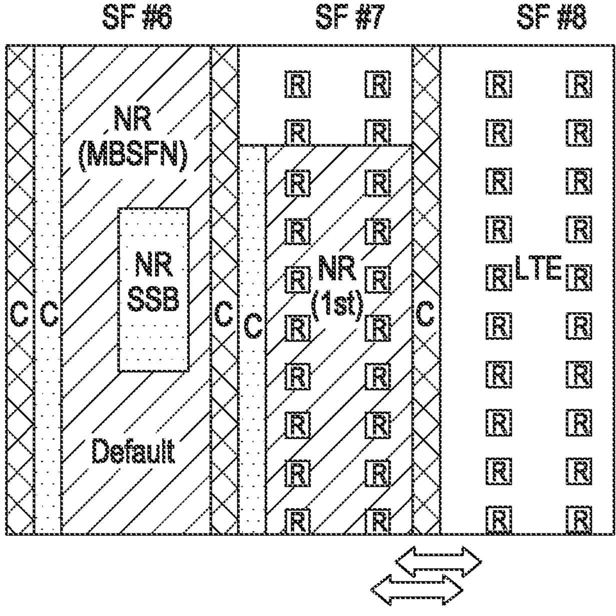
FIG. 4C illustrates a scheme of dynamically sharing a spectrum in a DL by a multi-wireless communication system according to an embodiment of the disclosure using a time/frequency division multiplexing scheme.

FIG. 4C illustrates a dynamic spectrum sharing scheme of a multi-wireless communication system in a Time Division Multiplexing/Frequency Division Multiplexing (TDM/FDM) scheme. In the embodiment of FIG. 4C, an LTE BS and an NR BS in a multi-wireless communication system may allocate each subframe through a predetermined value of a predefined LTE/NR resource frequency/time division pattern or through real-time scheduling in consideration of the traffic of each system. For example, as illustrated in FIG. 4C, since subframe #6 is fixedly configured as an MBSFN frame (subframe) for the NR BS, subframe #6 may be allocated for the NR BS, subframe #7 may be frequency-divided and allocated to the LTE BS and the NR BS at a ratio of 1:5 in units of RBs in the FDM scheme, and subframe #8 may be allocated for the LTE BS in the TDM scheme. Even in this case, NR CORESET or the like should be considered as in the FDM scheme.

Figure 5:
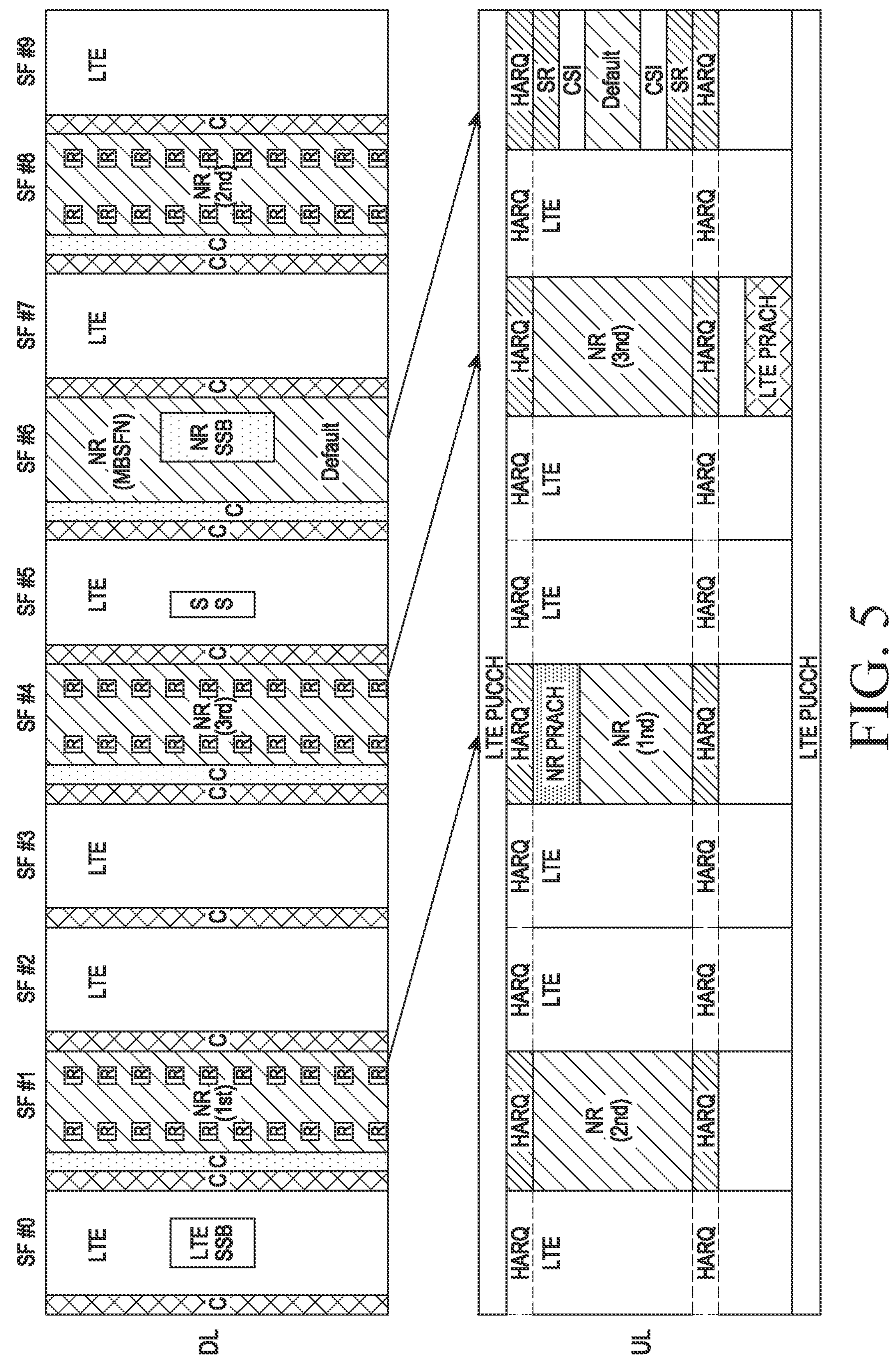
FIG. 5 illustrates a pairing scheme of DL and uplink (UL) when a multi-wireless communication system according to an embodiment of the disclosure share a dynamic spectrum.

FIG. 5 illustrates a pairing scheme of DL and UL when a multi-wireless communication system according to an embodiment of the disclosure dynamically shares a spectrum. According to the embodiments of FIGS. 4A, 4B, and 4C, after DL resources are allocated by dynamically sharing a spectrum, UL resources may be paired.

For example, as illustrated in FIG. 5, based on a value of Hybrid Automatic Repeat Request (HARQ) transmission timing (DL HARQ delay) (K1) of a Physical Uplink Control Channel (PUCCH) transmitted through a Physical Downlink Shared Channel (PDSCH) of DL subframe 1 (SF #1), the position of the UL subframe including the corresponding HARQ feedback may be determined.

As illustrated in FIG. 5, based on the UL Physical Uplink Shared Channel (PUSCH) transmission timing (UL scheduling delay) (K2) from a UL grant transmitted through a Physical Downlink Control Channel (PDCCH) of DL subframe 1 (SF #1), the position of the UL subframe including the corresponding PUSCH may be determined. For example, as illustrated in FIG. 5, K1=K2=3 may be satisfied, but is not limited thereto. In this way, the DL subframe may be paired with the UL subframe.

Figure 6:
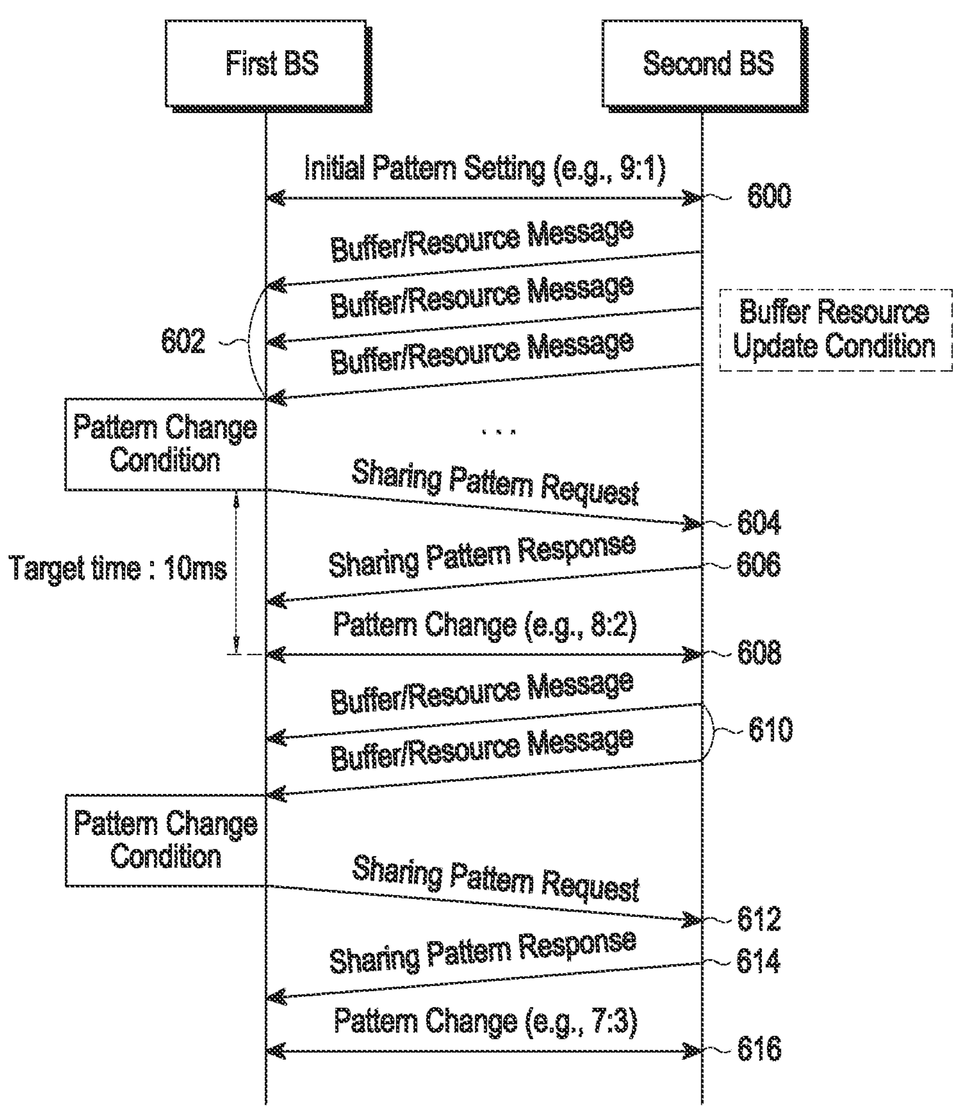
FIG. 6 is a flowchart schematically illustrating a spectrum sharing process of a multi-wireless communication system according to an embodiment of the disclosure.

FIG. 6 is a flowchart schematically illustrating a spectrum sharing process between a first BS and a second BS of a multi-wireless communication system according to an embodiment of the disclosure. In the embodiment of FIG. 6, although a multi-wireless communication system uses TDM to dynamically share a spectrum as an example, the multi-wireless communication system may also be applied to FDM or TDM/FDM schemes. In the embodiment of FIG. 6, when the first BS is an LTE BS, the second BS may be an NR BS. Alternatively, when the first BS is an NR BS, the second BS may be an LTE BS.

In FIG. 6, in operation 600, a first BS and a second BS may configure an initial resource sharing pattern. The resource sharing pattern may be used in the same meaning as a resource allocation ratio or a resource allocation pattern. For example, as illustrated in FIG. 6, the first BS and the second BS may configure a resource sharing pattern of LTE:NR=9:1 as an initial resource sharing pattern. In this case, resources may be allocated, for example, according to the manner of the embodiment of FIG. 4A.

In operation 602, the second BS may periodically transmit a buffer/resource message including network information of the second BS to the first BS according to a request of the first BS or information indicating whether a predefined condition (e.g., buffer/resource update condition) is satisfied. As an embodiment, the buffer/resource related message may include the amount of data accumulated in the buffer of at least one terminal connected to the second BS, the amount of resources used for data transmission, and/or the number of RRC connected terminals (e.g., a terminal connected to the BS by RRC).

The first BS may determine a resource allocation ratio suitable for the resource network situation based on network information of the second BS received from the second BS and network information of the first BS, and may transmit a request message (a sharing pattern request message) including information on the determined resource allocation ratio to the second BS in operation 604. As an embodiment, the first BS may determine whether a condition for changing a predefined resource sharing pattern is satisfied based on the received network information of the second BS and network state information of the first BS, and may determine a new resource sharing pattern based on the determination. For example, the first BS may determine a new resource allocation ratio when the condition for changing the predefined resource sharing pattern is satisfied.

The second BS may transmit a response message (a sharing pattern response message) corresponding to the request message to the first BS in operation 606. The first BS may change the resource sharing pattern to a newly determined resource sharing pattern based on the response message.

For example, the first BS may change the resource sharing pattern to the newly determined resource sharing pattern when the response message is received within a predefined period (target time, e.g., 10 ms) from the time of transmitting the request message. Through this, the resource allocation ratio of the first BS and the second BS may be changed to a determined resource allocation ratio (e.g., from LTE: NR=9:1 to LTE:NR=8:2) in operation 608.

Next, the first BS and the second BS may share resources within one frame according to the determined resource allocation ratio (e.g., LTE:NR=8:2 in Table 1), and operations 602 to 608 of FIG. 6 may be repeated periodically in operations 610 to 616.

Figure 7:
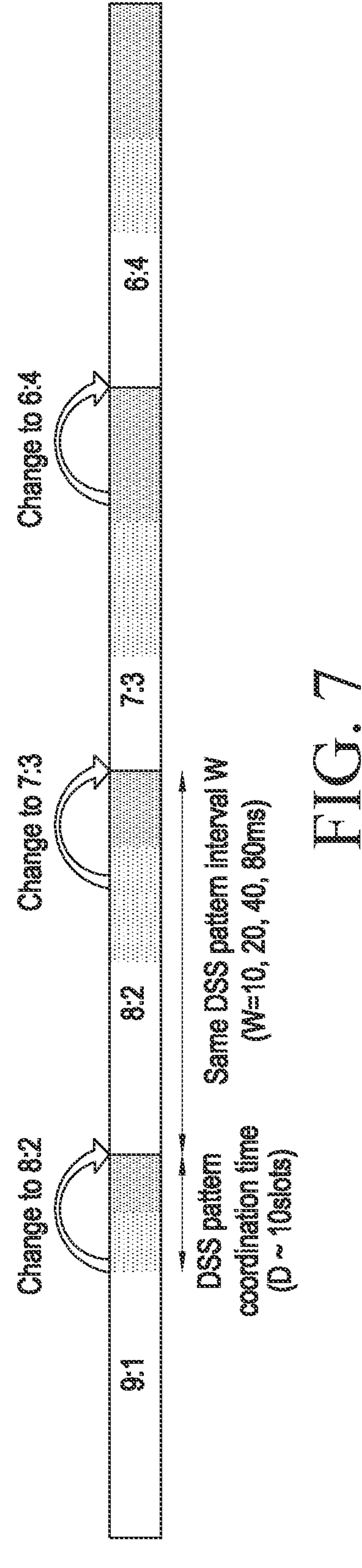
FIG. 7 illustrates a process of periodically changing a resource allocation ratio by a multi-wireless communication system according to an embodiment of the disclosure.

FIG. 7 illustrates a process of periodically changing a resource allocation ratio by a multi-wireless communication system according to an embodiment of the disclosure. In the embodiment of FIG. 7, a resource allocation ratio change period (DSS pattern interval W in FIG. 7) is one of 10 ms, 20 ms, 40 ms, and 80 ms. However, the disclosure is not limited thereto, and the resource allocation ratio change period may be configured to a different value. In this case, the same resource sharing pattern is maintained during the corresponding change period.

According to the embodiment of FIG. 7, when the time for changing the resource allocation ratio arrives, the multi-wireless communication system (the first BS or the second BS) may determine the resource allocation ratio according to the network conditions of the first BS and the second BS after scheduling the corresponding frame. For example, in the multi-wireless communication system, the resource allocation ratio may be determined in consideration of non-Guaranteed Bit Rate (GBR) data after scheduling signals having a high priority, such as system overhead, control signals, and GBR data.

In an embodiment, when the determined resource allocation ratio and the current resource allocation ratio are different, a Pattern Coordination Time (DSS pattern coordination time in FIG. 7) for changing the current resource allocation ratio to the may be determined to be within a predefined time, for example, within a maximum of 10 subframes (or slots).

As a scheme of determining the resource allocation ratio, various other factors may be considered in addition to the above considerations. In the disclosure, such as in the embodiment of FIG. 8 or the embodiment of FIG. 9, the process of determining the resource allocation ratio considering different factors according to the network conditions will be descried. That is, a resource allocation ratio determination operation will be described below.

Figure 8:
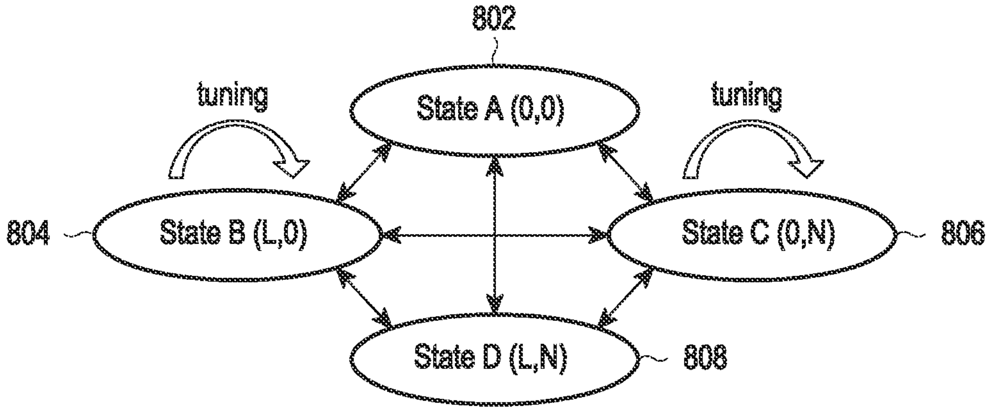
FIG. 8 schematically illustrates definition of each state, state change, and an operation according to the state according to an embodiment of the disclosure.

FIG. 8 illustrates definition of each state, state change, and an operation according to the state. In FIG. 8, in a multi-wireless communication system, for example, a first BS may classify states according to the traffic conditions of an LTE communication system and a 5G communication system, and may determine a resource allocation ratio by applying a different operation according to each state.

When the size of data accumulated in a buffer of each terminal connected to the first BS and/or the second BS exceeds a specific threshold (e.g., 1000 Kbit), the terminal may be classified as a heavy BO terminal. The states may be classified according to the presence or absence of a heavy BO terminal on an LTE communication system and an NR communication system.

In an embodiment, state A 802 may be defined as a state in which there is no heavy BO terminal in both systems. State B 804 may be defined as a state in which the heavy BO terminal exists only in the LTE communication system. State C 806 may be defined as a state in which the heavy BO terminal exists only in the NR communication system. State D 808 may be defined as a state in which the heavy BO terminal exists in both the LTE communication system and the NR communication system. In the disclosure, state A, state B, state C, and state D may be referred to as a first state, a second state, a third state, and a fourth state, respectively.

According to the embodiment, when there is no heavy BO terminal or when the number of heavy BO terminals is less than or equal to a predetermined number, it may be determined that there is no heavy BO terminal for the corresponding system. In this case, state A refers to a state in which the number of heavy BO terminals in both the LTE and NR systems is less than or equal to a predetermined first value, state B refers to a state in which the number of heavy BO terminals of the LTE terminal exceeds the predetermined first value and the number of heavy BO terminals of the NR system is equal to or less than the predetermined first value, the state C refers to a state in which the number of heavy BO terminals of the LTE system is equal to or less than the predetermined first value and the number of heavy BO terminals of the NR system exceeds the predetermined first value, and state D refers to a state in which the number of heavy BO terminals in both the LTE and NR systems exceeds the predetermined first value.

When the presence or absence of the heavy BO terminal is changed over time, each state may be changed to a different state. In this way, the multi-wireless communication system may classify the states into four states according to traffic conditions and may determine the resource allocation ratio through an operation to be described later. For example, the scheme of determining the resource allocation ratio may apply various operations, such as considering the amount of data remaining in the buffers of terminals connected to each BS or selecting an appropriate resource sharing pattern after virtually scheduling the remaining data.

In the disclosure, an operation for determining resource allocation based on a Physical Resource Block (PRB) usage and a Physical Downlink Control Channel (PDCCH) allocation failure rate of the first BS and the second BS will be described. Depending on the embodiment, the minimum unit for allocating resources may be configured in various ways, such as a slot or a Resource Block (RB). In the disclosure, a scheme of sharing a spectrum through an LTE/NR resource time division pattern (Table 1) is exemplified.

First, an operation for determining resource allocation based on the PRB usage of the first BS and the second BS will be described. After scheduling, the first BS and the second BS may determine the traffic of each system through the number of remaining RBs and may determine a resource sharing pattern. When each of the above states is changed or when the states of state A and state D are maintained, a pattern (e.g., LTE:NR=7:3) may be determined through a ratio of users connected to the first BS and the second BS and having data to be transmitted, and when state B and state C are maintained, resource allocation may be adjusted through a pattern tuning process.

Figure 9:
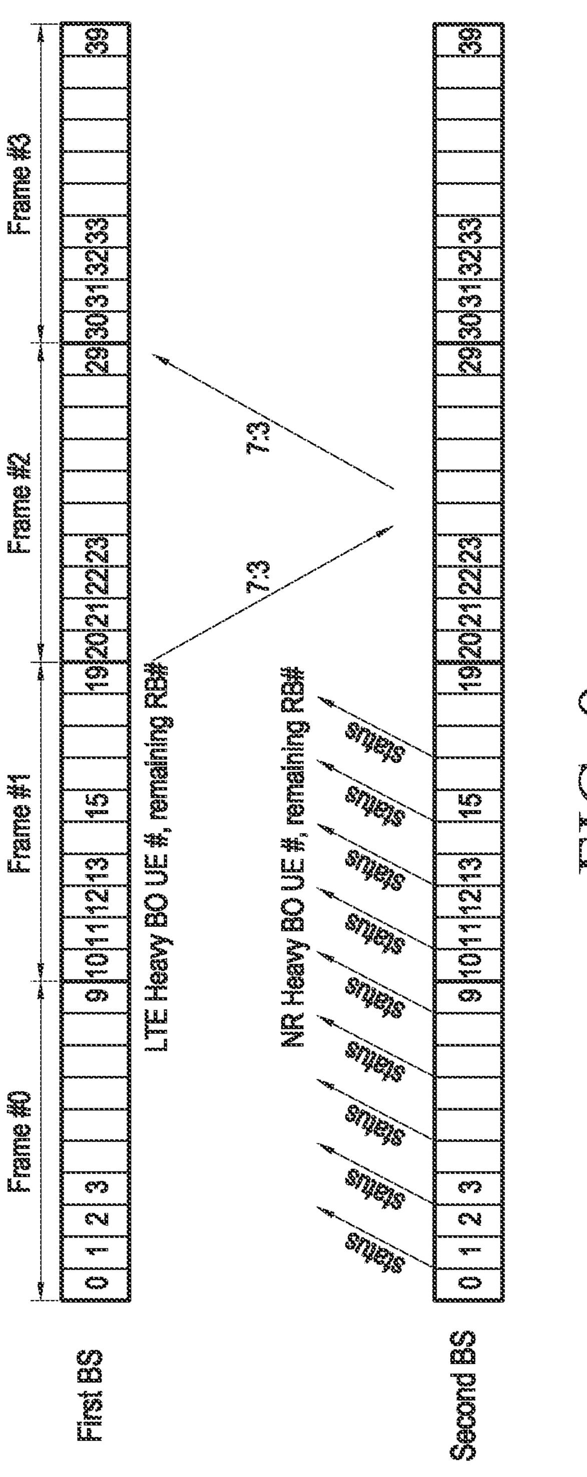
FIG. 9 illustrates a process of operating a resource allocation ratio determination operation according to an embodiment of the disclosure.

FIG. 9 illustrates a process in which a resource allocation ratio determination operation according to an embodiment of the disclosure operates. In the embodiment of FIG. 9, a first BS may be an LTE BS. In the embodiment of FIG. 9, the second BS may be a NR BS.

In FIG. 9, a second BS may transmit network information of the second BS to the first BS. As an embodiment, the second BS may transmit the network information of the second BS to the first BS periodically or in response to a request of the first BS. As an embodiment, the network information may include information on the number of RRC connected terminals (e.g., terminals connected to the BS by RRC), information on the amount of data accumulated in the buffer of at least one terminal connected to the BS, and/or the amount of resources used for data transmission, and may transmit other information according to the operation, and the disclosure is not limited thereto.

When a resource allocation ratio determination period (e.g., the time when subframe #9 of frame #0 in FIG. 9 has passed) arrives, the first BS checks the state of each system before determining a new resource allocation ratio. For example, the first BS may determine the state based on the number of heavy BO terminals of the LTE communication system and the 5G communication system and/or the number of each remaining RB.

The first BS may determine a new resource allocation ratio based on the received network information of the second BS and/or the network information of the first BS, for example, when scheduling of frame #1 is finished (when subframe #19 of Frame #1 in FIG. 9 has passed). For example, when the state is changed, the first BS may determine a resource sharing pattern according to the ratio of terminals having data to be transmitted to the first BS and the second BS (Table 2).

In addition to this, depending on the embodiment, the first BS may configure an initial start pattern in advance according to the state, or may apply various schemes such as determining the resource sharing pattern according to the ratio of the amount of data in the buffer of the first BS and the second BS, etc.

Table 2 shows an example of a resource sharing pattern according to a ratio of users having data to be transmitted in LTE/NR.

TABLE 2

| LTE/NR pattern | LTE/NR UE ratio (number of users for LTE/number of users for NR) DssRatio |
|---|---|
| 9:1 | DssRatio > 9.0 |
| 8:2 | 9.0 > DssRatio >= 4.0 |
| 7:3 | 4.0 > DssRatio >= 2.3333 |
| 6:4 | 2.3333 > DssRatio >= 1.5 |
| 5:5 | 1.5 > DssRatio >=1.0 |
| 4:6 | 1.0 > DssRatio >= 0.6666 |
| 3:7 | 0.6666 > DssRatio >= 0.4286 |

TABLE 2-continued

| LTE/NR pattern | LTE/NR UE ratio (number of users for LTE/number of users for NR) DssRatio |
|---|---|
| 2:8 | 0.4286 > DssRatio >= 0.25 |
| 1:9 | 0.25 > DssRatio |

In Table 2, for example, when the ratio value of terminals (with data to be transmitted) of LTE/NR, that is, a value (number of LTE users/number of NR users) is 9 or more, an LTE/NR resource sharing pattern has a first value (e.g., LTE:NR=9:1). Alternatively, when the ratio of terminals (having data to be transmitted) of LTE/NR, that is, a value (the number of LTE users/the number of NR users) is greater than or equal to 4 and less than 9, the LTE/NR resource sharing pattern has a second value (e.g., LTE:NR=8:2).

When the state is equally maintained as a result of checking the state of each system before the first BS determines the new resource allocation ratio, and when state A or state D is maintained according to the embodiment of FIG. 9, the first BS may determine a pattern according to the ratio of terminals having data to be transmitted, and when state B or state C is maintained, the first BS may perform a pattern tuning process. In this disclosure, the pattern tuning process applied when the states of state B and state C are maintained is defined as a process of tuning the resource sharing pattern in consideration of the traffic of the system without a heavy BO terminal.

In the embodiment of FIG. 9, a communication system using a bandwidth of 10 MHz (50 RB) is illustrated. For example, when state B is maintained, the first BS may adjust the pattern based on the number of remaining RBs among resources of the NR communication system allocated within one frame after scheduling is performed (Table 3).

Table 3 shows an example of a pattern tuning process when state B is maintained as a result of checking the state of each system before determining a new resource sharing pattern.

TABLE 3

| NR RB usage situation | High | Medium | Low | Very Low |
|---|---|---|---|---|
| Remaining amount of RB of NR | 25 RB or less | 25 RB to 75 RB | 75 RB to 125 RB | 125 RB or greater |
| Number of Connected UEs | Number of LTE users < number of NR users | — | — | — |
| Pattern Tuning | NR 1 slot + LTE 1 slot − | — | NR 1 slot − LTE 1 slot + | NR 2 slot − LTE 2 slot + |

In Table 3, when the number of RBs of the NR system remaining in one frame is less than half (e.g., 25 RBs) of the entire RBs of the NR system (NR RB usage situation: High), the first BS may determine that the amount of resources compared to traffic is insufficient, and may perform tuning by reducing the number of slots allocated to the LTE system by one and increasing the number of slots allocated to the NR system by one.

However, the pattern tuning process in state B proceeds only when the number of terminals accessing the NR system is greater than the number of terminals accessing the LTE system. This is because the LTE system with a heavy BO user may consume almost all resources.

In addition, according to an embodiment, when the number of remaining RBs in the NR system is 75 RBs or greater (NR RB usage situation: low), since the first BS may determine that the allocated resource is sufficient enough to waste one or more slots, the number of slots allocated to the NR system may be reduced by one and the number of slots allocated to LTE may be increased by one through pattern tuning.

In an embodiment, in order to quickly respond to traffic conditions of each system, when the number of remaining RBs in the NR system is 125 RBs or greater (NR RB usage situation: very low), the first BS may perform pattern tuning in units of 2 slots. The amount of remaining RBs of the NR system, which is a criterion for the RB usage situation of the NR system, and the slot unit of pattern tuning may have different values, and the disclosure is not limited thereto. When state C is maintained, contrary to the case where state B is maintained, since there are heavy BO users only in the NR communication system, the first BS may adjust the pattern based on the number of RBs remaining among the resources of the LTE communication system allocated within one frame after scheduling is performed, as shown in the Table 4, below.

Table 4 shows an example of a pattern tuning process when state C is maintained as a result of checking the state of each system before determining a new resource sharing pattern.

TABLE 4

| LTE RB usage situation | High | Medium | Low | Very Low |
|---|---|---|---|---|
| Amount of remaining RB of LTE | 25 RB or less | 25 RB to 75 RB | 75 RB to 125 RB | 125 RB or greater |
| Number of Connected UEs | Number of NR users < number of LTE users | — | — | — |
| Pattern Tuning | LTE 1 slot + NR 1 slot − | — | LTE 1 slot − NR 1 slot + | LTE 2 slot − NR 2 slot + |

In FIG. 4, for example, when the number of RBs of the LTE system remaining in one frame is equal to or less than half (e.g., 25 RBs) of the entire RBs of the LTE system (LTE RB usage situation: High), the first BS may determine that the amount of resources compared to traffic is insufficient, and may perform tuning by reducing the number of slots allocated to the NR system by one and increasing the number of slots allocated to the LTE system by one. However, the pattern tuning process in state C proceeds only when the number of terminals accessing the LTE system is greater than the number of terminals accessing the NR system. This is for, since the NR system with heavy BO users consumes almost all resources, considering this.

In addition, according to an embodiment, when the number of remaining RBs in the LTE system is 75 RBs or greater (LTE RB usage situation: low), since the first BS may determine that the allocated resource is sufficient enough to waste one or more slots, the number of slots allocated to the LTE system may be reduced by one and the number of slots allocated to NR may be increased by one through pattern tuning.

As an embodiment, in order to quickly respond to the traffic condition of each system, when the number of remaining RBs in the LTE system is 125 RBs or more (LTE RB usage situation: very low), pattern tuning may be performed in units of 2 slots. The amount of remaining RBs of the LTE system, which is a criterion for the RB usage situation of the LTE system, and the slot unit of pattern tuning may have different values, and the disclosure is not limited thereto.

An operation for determining resource allocation based on a Physical Downlink Control Channel (PDCCH) allocation failure rate of the first BS and the second BS will be described. After scheduling, the network state of the LTE communication system and the NR communication system may be predicted through the PDCCH allocation failure rate of the first BS and the second BS, and through this, the resource sharing pattern may be determined. As an embodiment, the network state of each system may be classified into six cases (as shown in Table 5, below) according to the PDCCH allocation failure rate of the first BS and the second BS. Table 5 shows an example of six cases according to the PDCCH allocation failure rate of LTE/NR.

TABLE 5

| Case type | |
|---|---|
| Case L1 | When control channel allocation failure rate of LTE DL(or UL) is x1 % or more |
| Case L2 | When LTE control channel allocation failure rate does not correspond to case L1, case L3 |
| Case L3 | When Control channel allocation failure rate of LTE DL(or UL) is x2 % or less |
| Case N1 | When Control channel allocation failure rate of NR DL(or UL) is x3 % or more |
| Case N2 | When NR Control channel allocation failure rate does not correspond to case N1, case N3 |
| Case N3 | When Control channel allocation failure rate of NR DL(or UL) is x4 % or less |

In Table 5, for example, cases may be classified according to whether a specific threshold (e.g., x1, x2, x3, or x4) is satisfied for each PDCCH allocation failure rate of the first BS and the second BS at the time of resource allocation. The first BS may determine the initial resource allocation ratio according to the state in the same way as the first operation (that is, operation for determining resource allocation based on PRB usage), and may use various schemes such as determining the resource allocation ratio according to the ratio of the amount of data in the buffer of the first BS and the second BS.

When state B or state C is maintained, the first BS adjusts resource allocation according to the PDCCH allocation failure rate of the first BS and the second BS (as shown in Table 6, below). Like the first operation, such as in state B and state C, in a situation where a heavy BO terminal exists in only one system, resources may be concentrated in only one system according to a PDCCH allocation failure rate, so that a constraint to prevent this should be configured. Table 6 shows an example of a scheme of adjusting resource allocation according to the PDCCH allocation failure rate of each LTE/NR.

TABLE 6

| NR\LTE | Case L1 | Case L2 | Case L3 |
|---|---|---|---|
| Case N1 | Maintain | NR resource addition | NR resource addition |
| Case N2 | LTE resource addition | Maintain | Maintain |
| Case N3 | LTE resource addition | Maintain | Maintain |

In Table 6, as an embodiment, when the NR system corresponds to Case N1 and the LTE system corresponds to Case L1, the resource allocation ratio remains the same. In addition, when the NR system corresponds to Case N1 and the LTE system corresponds to Case L2, since the PDCCH allocation failure rate of the LTE system is lower than the case where the NR system corresponds to Case N1 and the LTE system corresponds to Case L1, more resources may be allocated to the NR so that the NR resources may be added.

Figure 10:
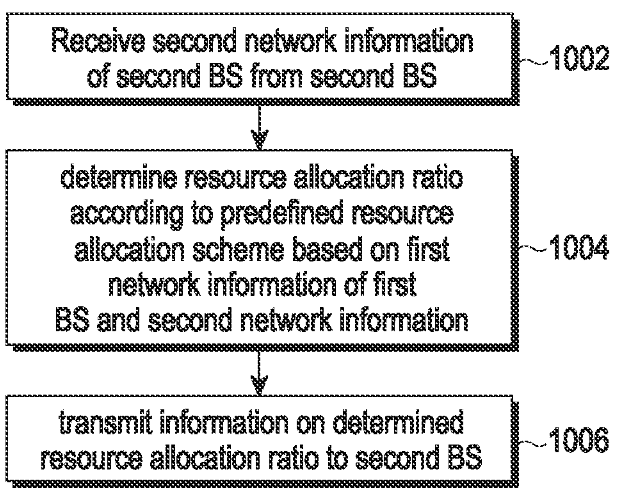
FIG. 10 is a flowchart illustrating a spectrum allocation process of a first base station according to an embodiment of the disclosure.

FIG. 10 is a flowchart illustrating a spectrum allocation process of a first BS according to an embodiment of the disclosure. The first BS receives second network information of the second BS from the second BS in operation 1002. As described above in the embodiment of FIG. 9, the network information may include information on the number of terminals connected to the BS, information on the amount of data accumulated in the buffer of at least one terminal connected to the BS, and/or the amount of resources used for data transmission. The first BS supports a wireless access scheme different from that of the second BS and shares the same frequency band as the second BS. The first BS determines a resource allocation ratio according to a predefined resource allocation scheme based on the received second network information and the first network of the first BS in operation 1004. A predefined resource allocation scheme may include an operation of determining the state for the multi-wireless communication system based on the information on the amount of data accumulated in the buffer of at least one terminal connected to the first BS and the information on the amount of data accumulated in the buffer of at least one terminal connected to the second BS.

As described above in the embodiment of FIG. 8, the state may be classified according to the presence or absence of the heavy BO terminal, and may be one of state A, state B, state C, and state D, that is, a first state, a second state, a third state, and a fourth state. The heavy BO terminal may be determined based on whether the amount of data accumulated in the buffer of the corresponding terminal exceeds a specific threshold.

In an embodiment, when the state is changed, when the first state is maintained, or when the fourth state is maintained, the operation of determining the resource allocation ratio is the same as that described above in Table 2. Specifically, based on the information on the number of terminals connected to the first BS and the information on the number of terminals connected to the second BS, the process may include determining a ratio of terminals between the first BS and the second BS and determining the resource allocation ratio between the first BS and the second BS based on the determined ratio of terminals.

In another embodiment, when the second state or the third state is maintained, the operation of adjusting the resource allocation ratio is the same as that described above in Table 3 and Table 4. Specifically, based on information on the amount of resources used for data transmission of the second BS, the process may include determining the amount of remaining resources for the second BS, and adjusting the resource allocation ratio between the first BS and the second BS based on the amount of remaining resources.

The first BS transmits the determined information on resource allocation ratio to the second BS in operation 1006.

Figure 11:
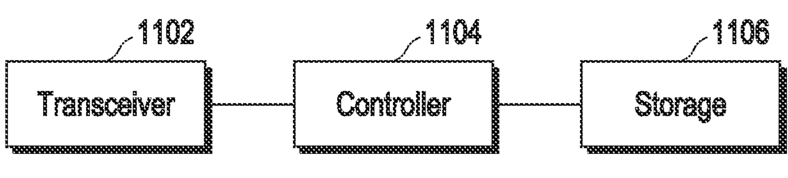
FIG. 11 illustrates a structure of a first base station according to an embodiment of the disclosure.

FIG. 11 illustrates a structure of a first BS according to an embodiment of the disclosure.

In FIG. 11, the first BS may include a transceiver 1102 and a controller 1104. In this disclosure, the controller may be defined as a circuit, an application specific integrated circuit, or at least one processor. The transceiver 1102 may transmit and receive signals to and from other network entities. The transceiver 1102 may transmit system information to, for example, a second BS or a terminal, and may transmit a synchronization signal or a reference signal.

The controller 1104 may control the overall operation of the first BS according to the embodiment proposed in the disclosure. For example, the controller 1104 may control signal flow between blocks to perform operations according to the flowchart described above. Specifically, the controller 1120 may control an operation proposed in the disclosure for spectrum sharing between the multiple wireless communication systems according to an embodiment of the disclosure.

The storage 1106 may store at least one of information transmitted and received through the transceiver 1102 and information generated through the controller 1104. For example, the storage 1106 may store network information received from the second BS, information related to data accumulated in the buffer, and a resource allocation ratio determination period.

Figure 12:
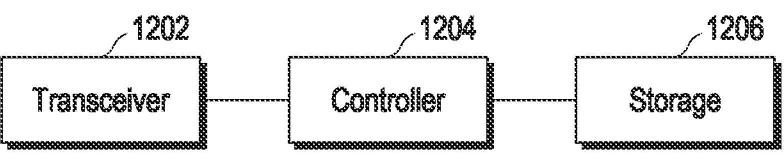
FIG. 12 illustrates a structure of a second base station according to an embodiment of the disclosure.

FIG. 12 illustrates a structure of a second BS according to an embodiment of the disclosure. In FIG. 12, the second BS may include a transceiver 1202 and a controller 1204. In this disclosure, the controller may be defined as a circuit, an application specific integrated circuit, or at least one processor. The transceiver 1202 may transmit and receive signals to and from other network entities. The transceiver 1202 may transmit system information to, for example, the first BS or terminal, and may transmit a synchronization signal or a reference signal.

The controller 1204 may control the overall operation of the second BS according to the embodiment proposed in the disclosure. For example, the controller 1204 may control signal flow between blocks to perform an operation according to the flowchart described above. Specifically, the controller 1204 may control an operation proposed in the disclosure for spectrum sharing between multiple wireless communication systems according to an embodiment of the disclosure.

The storage 1206 may store at least one of information transmitted and received through the transceiver 1202 and information generated through the controller 1204. For example, the storage 1206 may store network information received from the first BS, information related to data accumulated in a buffer, and a resource allocation ratio determination period.

Figure 13:
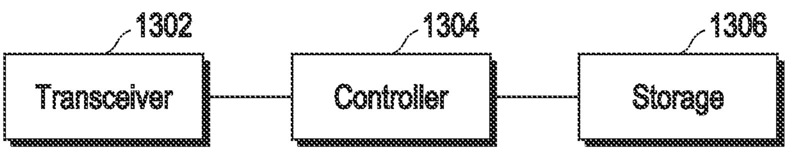
FIG. 13 illustrates a structure of a terminal according to an embodiment of the disclosure.

FIG. 13 illustrates a structure of a terminal according to an embodiment of the disclosure. In FIG. 13, the terminal may include a transceiver 1302 and a controller 1304. In this disclosure, the controller may be defined as a circuit, an application specific integrated circuit, or at least one processor. The transceiver 1302 may transmit and receive signals to and from other network entities. The transceiver 1302 may transmit system information to, for example, a first BS, a second BS, or another terminal, and may transmit a synchronization signal or a reference signal.

The controller 1304 may control the overall operation of the terminal according to the embodiment proposed in the disclosure. For example, the controller 1304 may control signal flow between blocks to perform an operation according to the flowchart described above. Specifically, the controller 1304 may control an operation proposed in the disclosure for spectrum sharing between multiple wireless communication systems according to an embodiment of the disclosure. The storage 1306 may store at least one of information transmitted and received through the transceiver 1302 and information generated through the controller 1304.

The embodiments of the disclosure described and shown in the specification and the drawings are merely specific examples that have been presented to easily explain the technical contents of the disclosure and help understanding of the disclosure, and are not intended to limit the scope of the disclosure. That is, it will be apparent to those skilled in the art that other variants based on the technical idea of the disclosure may be implemented. Further, the above respective embodiments may be employed in combination, as necessary.

What is claimed is:

1. A method performed by a first base station (BS) in a wireless communication system, the method comprising:

receiving second network information of a second BS from the second BS in the wireless communication system, wherein the first BS supports a first wireless access scheme that is different from a second wireless access scheme of the second BS, and shares a same frequency band with the second BS;

determining a resource allocation ratio between the first BS and the second BS according to a predefined resource allocation scheme, based on first network information of the first BS and the second network information of the second BS, wherein the first network information comprises information on an amount of data in a buffer of at least one first terminal connected to the first BS, and the second network information comprises information on an amount of data in a buffer of at least one second terminal connected to the second BS; and transmitting information on the resource allocation ratio to the second BS.

2. The method of claim 1, wherein the first network information further comprises at least one of information on a number of terminals connected to the first BS, or information on an amount of resources used for data transmission of the first BS, and wherein the second network information further comprises at least one of information on a number of terminals connected to the second BS, or information on an amount of resources used for data transmission of the second BS.

3. The method of claim 2, wherein the determining the resource allocation ratio comprises determining a state for the wireless communication system based on the information on the amount of data in the buffer of the at least one first terminal connected to the first BS and the information on the amount of data in the buffer of the at least one second terminal connected to the second BS.

4. The method of claim 3, wherein the state is one of:

a first state in which a number of heavy Buffer Occupancy (BO) terminals connected to the first BS and a number of heavy BO terminals connected to the second BS are equal to or less than a first value;

a second state in which the number of heavy BO terminals connected to the first BS exceeds the first value and the number of heavy BO terminals connected to the second BS is less than or equal to the first value;

a third state in which the number of heavy BO terminals connected to the first BS is less than or equal to the first value and the number of heavy BO terminals connected to the second BS exceeds the first value; and a fourth state in which the number of heavy BO terminals connected to the first BS and the number of heavy BO terminals connected to the second BS exceed the first value, and wherein a heavy BO terminal is determined based on whether the amount of data accumulated in a buffer of a corresponding terminal exceeds a specific threshold.

5. The method of claim 4, wherein the determining the resource allocation ratio comprises, in case that the state is changed, the first state is maintained, or the fourth state is maintained:

determining a ratio of terminals between the first BS and the second BS based on the information on the number of terminals connected to the first BS and the information on the number of terminals connected to the second BS; and determining the resource allocation ratio between the first BS and the second BS based on the determined ratio of terminals.

6. The method of claim 4, wherein the determining the resource allocation ratio comprises, in case that the second state is maintained:

determining an amount of remaining resources for the second BS based on the information on the amount of resources used for data transmission of the second BS; and tuning the resource allocation ratio between the first BS and the second BS based on the amount of remaining resources.

7. The method of claim 4, wherein the determining the resource allocation ratio comprises, in case that the third state is maintained:

determining an amount of remaining resources for the first BS based on the information on the amount of resources used for data transmission of the first BS; and tuning the resource allocation ratio between the first BS and the second BS based on the amount of remaining resources.

8. The method of claim 1, wherein the first wireless access scheme is a Long Term Evolution (LTE) wireless access scheme, and wherein the second wireless access scheme is a New Radio (NR) wireless access scheme.

9. A first base station (BS) in a wireless communication system, the first BS comprising:

a transceiver;

memory storing instructions, and at least one processor coupled to the transceiver and the memory, wherein the instructions when executed by the at least one processor, individually or collectively, cause the first BS to:

receive second network information of a second BS from the second BS in the wireless communication system, wherein the first BS is configured to support a first wireless access scheme that is different from a second wireless access scheme of the second BS, and share a same frequency band with the second BS;

determine a resource allocation ratio between the first BS and the second BS according to a predefined resource allocation scheme, based on first network information of the first BS and the second network information of the second BS, wherein the first network information comprises information on an amount of data in a buffer of at least one first terminal connected to the first BS, and the second network information comprises information on an amount of data in a buffer of at least one second terminal connected to the second BS; and transmit information on the resource allocation ratio to the second BS.

10. The first BS of claim 9, wherein the first network information further comprises at least one of information on a number of terminals connected to the first BS, or information on an amount of resources used for data transmission of the first BS, and wherein the second network information further comprises at least one of information on a number of terminals connected to the second BS, or information on an amount of resources used for data transmission of the second BS.

11. The first BS of claim 10, wherein the instructions when executed by the at least one processor, individually or collectively, cause the first BS further to determine a state for the wireless communication system based on the information on the amount of data in the buffer of the at least one first terminal connected to the first BS and the information on the amount of data in the buffer of the at least one second terminal connected to the second BS.

12. The first BS of claim 11, wherein the state is one of:

a first state in which a number of heavy Buffer Occupancy (BO) terminals connected to the first BS and a number of heavy BO terminals connected to the second BS are equal to or less than a first value;

a second state in which the number of heavy BO terminals connected to the first BS exceeds the first value and the number of heavy BO terminals connected to the second BS is less than or equal to the first value;

a third state in which the number of heavy BO terminals connected to the first BS is less than or equal to the first value and the number of heavy BO terminals connected to the second BS exceeds the first value; and a fourth state in which the number of heavy BO terminals connected to the first BS and the number of heavy BO terminals connected to the second BS exceed the first value, and wherein a heavy BO terminal is determined based on whether the amount of data accumulated in a buffer of a corresponding terminal exceeds a specific threshold.

13. The first BS of claim 12, wherein the instructions when executed by the at least one processor, individually or collectively, cause the first BS further to, in case that the state is changed, the first state is maintained, or the fourth state is maintained:

determine a ratio of terminals between the first BS and the second BS based on the information on the number of terminals connected to the first BS and the information on the number of terminals connected to the second BS; and determine the resource allocation ratio between the first BS and the second BS based on the determined ratio of terminals.

14. The first BS of claim 12, wherein the instructions when executed by the at least one processor, individually or collectively, cause the first BS further to, in case that the second state is maintained:

determine an amount of remaining resources for the second BS based on the information on the amount of resources used for data transmission of the second BS; and tune the resource allocation ratio between the first BS and the second BS based on the amount of remaining resources.

15. The first BS of claim 12, wherein the instructions when executed by the at least one processor, individually or collectively, cause the first BS further to, in case that the third state is maintained:

determine an amount of remaining resources for the first BS based on the information on the amount of resources used for data transmission of the first BS; and tune the resource allocation ratio between the first BS and the second BS based on the amount of remaining resources.

16. The first BS of claim 9, wherein the first wireless access scheme is a Long Term Evolution (LTE) wireless access scheme, and wherein the second wireless access scheme is a New Radio (NR) wireless access scheme.

17. A non-transitory computer-readable storage medium storing instructions which, when executed by at least one processor of a first base station (BS) in a wireless communication system, individually or collectively, cause the first base station to perform operations comprising:

receiving second network information of a second BS from the second BS in the wireless communication system, wherein the first BS supports a first wireless access scheme that is different from a second wireless access scheme of the second BS, and shares a same frequency band with the second BS;

determining a resource allocation ratio between the first BS and the second BS according to a predefined resource allocation scheme, based on first network information of the first BS and the second network information of the second BS, wherein the first network information comprises information on an amount of data in a buffer of at least one first terminal connected to the first BS, and the second network information comprises information on an amount of data in a buffer of at least one second terminal connected to the second BS; and transmitting information on the resource allocation ratio to the second BS.

18. The non-transitory computer-readable storage medium of claim 17, wherein the first network information further comprises at least one of information on a number of terminals connected to the first BS, or information on an amount of resources used for data transmission of the first BS, and wherein the second network information further comprises at least one of information on a number of terminals connected to the second BS, or information on an amount of resources used for data transmission of the second BS.

19. The non-transitory computer-readable storage medium of claim 18, wherein the determining the resource allocation ratio comprises determining a state for the wireless communication system based on the information on the amount of data in the buffer of the at least one first terminal connected to the first BS and the information on the amount of data accumulated in the buffer of the at least one second terminal connected to the second BS.

20. The non-transitory computer-readable storage medium of claim 19, wherein the state is one of:

a first state in which a number of heavy Buffer Occupancy (BO) terminals connected to the first BS and a number of heavy BO terminals connected to the second BS are equal to or less than a first value;

a second state in which the number of heavy BO terminals connected to the first BS exceeds the first value and the number of heavy BO terminals connected to the second BS is less than or equal to the first value;

a third state in which the number of heavy BO terminals connected to the first BS is less than or equal to the first value and the number of heavy BO terminals connected to the second BS exceeds the first value; and a fourth state in which the number of heavy BO terminals connected to the first BS and the number of heavy BO terminals connected to the second BS exceed the first value, and wherein a heavy BO terminal is determined based on whether the amount of data accumulated in a buffer of a corresponding terminal exceeds a specific threshold.

* * * * *